US005621966A

United States Patent [19]
Kvenvold et al.

[11] Patent Number: 5,621,966
[45] Date of Patent: Apr. 22, 1997

[54] TUBE PULLER FOR HEAT EXCHANGERS

[76] Inventors: Charles J. Kvenvold; Judith M. Kvenvold, both of 5498 S. Morning Breeze Dr., Kearns, Utah 84118

[21] Appl. No.: 330,365

[22] Filed: Oct. 27, 1994

[51] Int. Cl.$^6$ .................................................. B23P 15/26
[52] U.S. Cl. ...................... 29/727; 29/426.5; 29/890.031; 29/426.4
[58] Field of Search ............................ 29/252, 726, 727, 29/890.031, 426.4, 426.5; 72/182, 197, 198, 248, 249, 369

[56] References Cited

U.S. PATENT DOCUMENTS

| | | | |
|---|---|---|---|
| 4,000,556 | 1/1977 | Ciminero | 29/427 |
| 4,044,444 | 8/1977 | Harris | 29/727 |
| 4,095,335 | 6/1978 | Lassarat | 29/726 |
| 4,213,239 | 7/1980 | Filer | 29/726 |
| 4,280,274 | 7/1981 | Filer | 29/726 |
| 4,312,124 | 1/1982 | Calhoun | 29/726 |
| 4,468,944 | 9/1984 | Foss | 72/248 X |
| 4,514,161 | 4/1985 | Winter | 72/248 X |
| 4,815,201 | 3/1989 | Harris | 29/727 |
| 4,913,910 | 4/1990 | McCarville et al. | 72/197 X |
| 5,168,623 | 12/1992 | Rabe | 29/726 |
| 5,203,072 | 4/1993 | Boisture | 29/726.5 |
| 5,291,651 | 3/1994 | Frame | 29/726 |

*Primary Examiner*—S. Thomas Hughes
*Attorney, Agent, or Firm*—Broadbent, Hulse, Pierce & Pate

[57] ABSTRACT

A tube puller, also called a traveler, removes tubes from the tube sheet of a heat exchanger for replacement. The tubes must first be broken free from the tube sheet and moved several inches by another device not associated with the traveler. The traveler includes a frame mounting a hydraulic motor. Inside the frame, a single driver mounted on the shaft of the motor is a wheel having a toothed circumference. The teeth of the driver engage one side of the tube to be removed. An unpowered idler is positioned on the opposite side of the tube from the driver. An actuator may move the idler selectively toward and away from the driver for altering the nip between the driver and idler to initially receive the tube. The actuator then presses the idler against the opposite side of the tube, holding the tube against the driver, but has no power to advance the tube longitudinally. Together, the idler and driver apply lateral forces that tend to deform the tube and may crush the tube completely as it is pulled. The idler may be equipped with a unidirectional clutch to prevent backward rotation, particularly during initial engagement of the tube by the driver and idler.

19 Claims, 9 Drawing Sheets

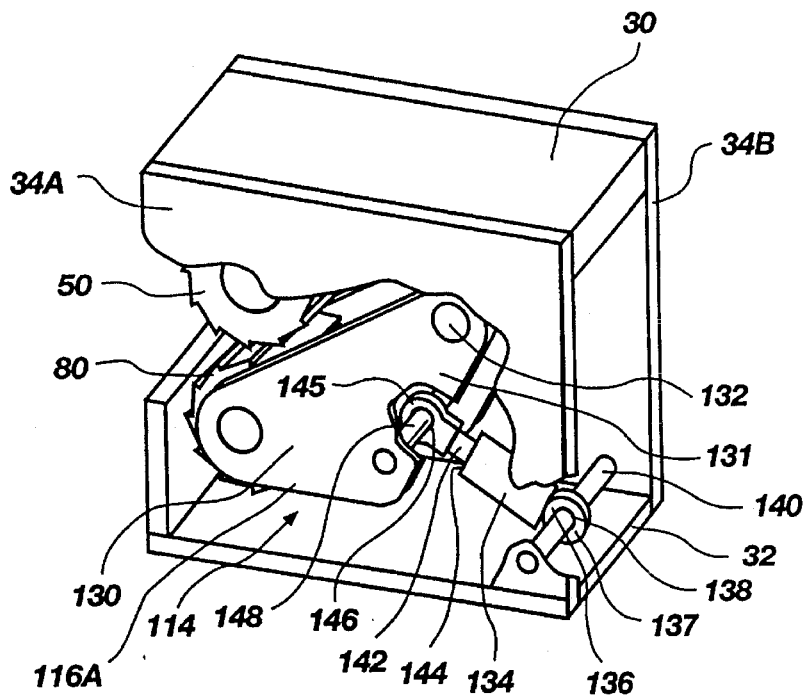
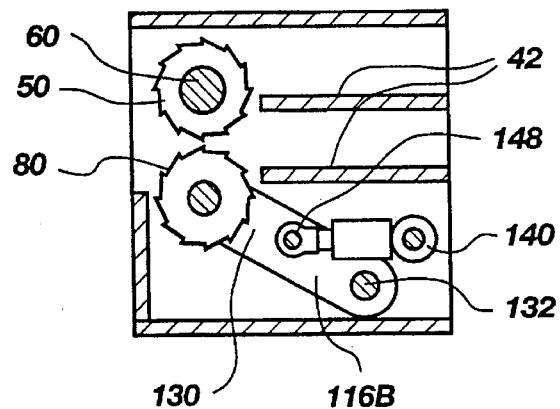
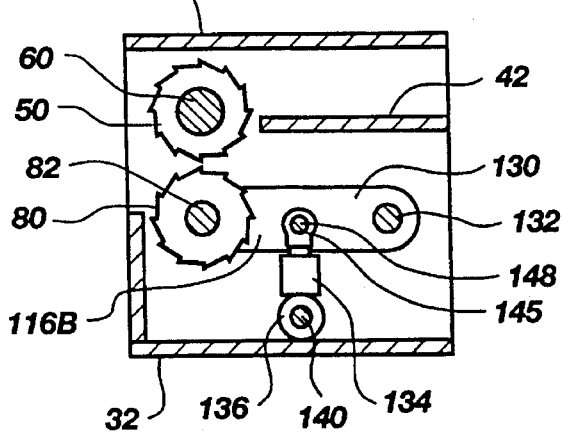
Fig. 11
Fig. 13
Fig. 12

TUBE PULLER FOR HEAT EXCHANGERS

BACKGROUND

1. The Field of the Invention

This invention relates to equipment for maintaining and repairing heat exchangers and, more particularly, to novel systems and methods for use in pulling tubes from heat exchangers for replacement.

2. The Background Art

A heat exchanger is any apparatus constructed for transferring heat from one object or medium to another. One type of common heat exchanger passes one fluid through tubes, and a second fluid flows over the outside of the tubes. Heat is exchanged between the fluid inside the tube and the fluid outside the tube. Heat will flow from the hotter fluid to the cooler fluid. Tubes may be provided with fins on an inside surface or on an outside surface to improve performance. Either fluid (inside or outside the tube) may be a liquid or a gas. A most common example of a heat exchanger is an automobile radiator. Another is a cooling coil on the back of a household refrigerator. Less visible, but equally common, heat exchangers include water heater cores, home furnace boilers, industrial boilers, and expansion coils in an air conditioner.

Industrial heat exchangers are often of the "shell-and-tube" type. A long shell or tank is provided with a bulkhead near each end. The bulkheads are provided with a latticework of closely spaced circular perforations. The perforations are sized to receive long tubes. Tubes fitted into the perforations extend from one bulkhead to the other. Tubes may be welded or swaged into place in the bulkheads, each forming a fluid-tight seal.

A shell-and-tube heat exchanger is typically assembled with one end of the tank and one bulkhead forming a first chamber or plenum. This end of the tank is provided with an inlet line (inlet pipe) for receiving fluid. The opposite end of the tank and the other bulkhead form a second plenum having an exit line (outlet pipe) for discharging fluid from the heat exchanger. Fluid can pass through the inlet line to the first plenum, into the tubes passing through the perforations in the first bulkhead, through the length of the tubes, out of the tubes at their ends passing through the second bulkhead, into the second plenum, and out of the second plenum through the exit line.

The bulkheads form another chamber or plenum. The walls of this plenum are formed by the bulkheads, the shell or tank wall extending between the bulkheads, and the outer surface of the tubes. An inlet line and outlet line pass fluid into and out of this plenum. Within the plenum, the fluid passes over the outside surfaces of the tubes "bundled" close to one another by the bulkheads. Thus, heat is transferred between the fluid inside the tubes and the fluid outside the tubes.

When tubes have been used for their useful life, they may be corroded (rust for example) or fouled (covered or plugged up by deposits). Corrosion may thin the walls of the tubes or pit them. Fouling typically occurs as stone-like deposits of various compounds precipitate out of the fluids passing through the tubes. Fouling deposits may accumulate on the inside surface, outside surface, or both, of a tube. Deposits inside a tube may completely block the tube, creating a rock-like "plug" in the tube.

Some heat exchangers have tubes that can be replaced. The shell is opened, exposing the bulkheads with their banks of tubes. Each tube is first broken free from the bulkhead (the "breaking" operation). Breaking often employs a combination of cutting or pressing, followed by a pull of a few inches. A hydraulic press of the collet type or the screw type may typically be used. The press engages one end of the tube and draws the tube through the bulkhead a distance of several inches.

After the tube is broken free, it must be removed. The hydraulic press cannot remove the tube. A longer stroke than that of the hydraulic press is required. Therefore, a mechanism is required to grasp a tube and draw it out quickly and completely from the bulkhead.

The hydraulic press has a very high force (tens of tons) over a very short stroke (distance of several inches). Compared to the hydraulic press, a lesser force (less than a ton, often less than 100 pounds) is adequate for removal of a tube. However the tube must be moved its entire length. The length of a tube may be from several feet to several dozen feet.

Numerous patents and other technical articles disclose methods for removing long tubes. The pullers for long tubes are sometimes referred to as travelers. The term "traveler" emphasizes the nature of the longer pulling operation at reduced force (the "traveling" operation) as compared to the short, powerful stroke of the hydraulic press in the "breaking" operation.

A traveler typically includes multiple, powered, synchronized wheels rotating opposite one another in close proximity. These "drive wheels" grasp and crush a tube between them. Helical springs provide the crushing force to keep the drive wheels close together. As a tube is crushed, it passes between the powered rollers.

The machinery for traveling is usually large and heavy. The operators must move the heavy traveler into position. Because the traveler is large, operators may not be able to see around it. Operators may have difficulty guiding the traveler toward the end of the tube if they cannot see it.

Also, the tube is ejected out the back of the traveler very rapidly. Moreover, the tube may be free to warp in any direction, because it is crushed, sometimes to a very thin, ribbon-like appearance. Unless one operator holds onto the tube to guide it, the tube may injure people, damage machinery, or clutter the work area.

The size also interferes with the breaking operation. If more than one tube extends away from the bulkhead (also called a tube sheet) within an area the size of the front face of the traveler, the traveler cannot reach the tubes. Each tube interferes with the traveler's approach to the other tubes. Thus, only one tube within a large area can be broken free in the breaking operation before the traveling operation must occur. That is, one tube is typically broken free, after which that tube must be traveled before the next tube can be broken free.

The hydraulic press is operated by a "breaking" operator, and the traveler is operated by a "traveling" operator. The breaking operator and the traveling operator must wait for each other, effectively operating in series. Only one operator and one machine are active at any time. Thus, one operator and one machine are idled (wasted) at all times.

The frequent exchanging of positions between the breaking and traveling operators adds additional wasted time. Moreover, the traveler must be moved large distances to accommodate the frequent exchange of positions. Safety is a concern in this circumstance where large pieces of heavy, powered equipment are moved rapidly about a constricted working area by a team of at least three workers (for breaking, traveling, and tube guiding at the exit of the traveler, respectively).

The great weight of the traveler makes large hoists necessary to move the traveler between tubes in a single bundle. A hoist requires additional controls to move the traveler up, down, right, left, forward and backward to the tube. These controls must be operated in series with the traveling operation, distracting the operator. Of course, the positioning of the traveler with the hoist is idle time in which tubes are not being traveled.

The size of the traveler is largely due to the complex machinery, multiple hoses, multiple hydraulic motors, and mounting hardware required to support the hydraulic loads.

In addition, the reliability of a machine is dependent on the number of parts, particularly moving parts. The travelers typically used have numerous, powered, moving parts.

Another difficulty with current travelers is their reliance on multiple drive wheels for engaging the tube. Making one drive wheel movable with respect to another adds parts, cost, complexity, weight and size. However relative translation is necessary for accommodating "plugs," large blockages of fouling deposits inside a tube.

If a plug is encountered in the tube, the traveler may be damaged. Some travelers release the drive wheels drawing the tube. However, the wheels typically can move only a very short distance apart. Moreover, the helical spring forces are not balanced or proportional with respect to the driving forces exerted by the drive wheels. Thus, the tube may stall or not engage properly when the drive wheels spin against the tube. If springs holding the drive wheels together are too strong, the drive wheels may not open properly at their nip point to grasp a larger tube and crush it initially. Yet, if springs are not strong enough, crushing may be hampered.

The size of the nip between drive wheels must be large enough to feed a tube, yet small enough to permit grasping the tube after crushing. Too high a spring load makes engagement of the tube difficult in the nip. Too low a spring load hampers crushing and may allow slipping when a plug is encountered. The crushing forces are not typically balanced with the driving forces of the drive motors.

Travelers are not typically guarded. A crushed tube is simply ejected from the back side of the traveler. The tube may bend in any direction, striking workers. A second person, in addition to the traveling operator is typically required to grasp a long, exiting tube and direct it.

BRIEF SUMMARY AND OBJECTS OF THE INVENTION

In view of the foregoing, it is one object of the present invention to increase the reliability of tube travelers.

Another object of the invention is to reduce the weight, size and the profile of a tube traveler.

It is an object of the invention to provide easier access to tubes to be traveled, and to allow breaking free more tubes before requiring traveling.

One object of the invention is to improve the speed at which the operations of breaking and traveling may be conducted.

It is an object of the invention to reduce the number of times that a breaking operator and a traveling operator must exchange places to obtain access to the workpiece (tube bundle).

It is an object of the invention to provide single-handed operation of the controls for a tube traveler.

One object of the invention is to provide safe handling of plugged tubes without damage to the traveler.

Another object of the invention is to provide for rapid opening, clamping and loading of a traveler on tubes.

Another object of the invention is to provide a more nearly constant load on the tubes being traveled.

Another object of the invention is to apply proportionally the clamping forces acting on a tube and the force of the drive wheel acting to travel the tube.

Another object of the invention is to guard workers against ejection of tubes in a random direction.

Another object of the invention is to travel tubes with an apparatus having fewer parts, fewer moving parts, fewer powered parts, fewer hydraulic motors, and fewer drive wheels than are currently required.

Consistent with the foregoing objects, and in accordance with the invention as embodied and broadly described herein, an apparatus is disclosed in one embodiment of the present invention as a traveler for removing tubes from a tube sheet. The apparatus includes a frame holding a motor having a housing secured to the frame. A rotatable shaft extends away from the housing.

A driver connects to the shaft to rotate with the shaft. The driver is positioned to contact a tube to be pulled. The driver contacts the tube at the outer diameter of the tube. Upon rotation, the driver urges the tube to move in a longitudinal direction. The driver may include an axle, a bearing and a wheel. The shaft of the motor may serve as the axle. The wheel may have teeth for increasing the stress applied to the tube. A controller connects to the motor for controlling the rotational speed of the driver.

An idler rotatably connects to the frame. The idler is free to rotate in at least one direction without appreciable resistance. The idler may urge the tube in a lateral direction against the driver. The idler and driver tend to collapse one portion of a wall of the tube toward another portion of the wall.

A carriage is connected to the frame to rotatably carry the idler. The carriage may slide, pivot, or the like with respect to the frame. The carriage may selectively position the idler with respect to the driver. An actuator is connected between the frame and the carriage holding the idler. The actuator selectively moves the idler between a first position away from the driver and a second position proximate the driver.

A fluid (working fluid) is selectively moveable into and out of the actuator for urging the actuator between the first position and the second position. The fluid may be oil, air, or an equivalent. The fluid may be incompressible or compressible.

A buffer may be in fluid communication with the actuator for absorbing impacts received by the actuator. A buffer is preferred when the working fluid is an incompressible liquid.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIGS. 11–13 are side elevation views of alternative embodiments of carriages in the apparatus of FIG. 1;

DETAILED DESCRIPTION OF THE PREFERRED EMBODIMENTS

Figure 1:
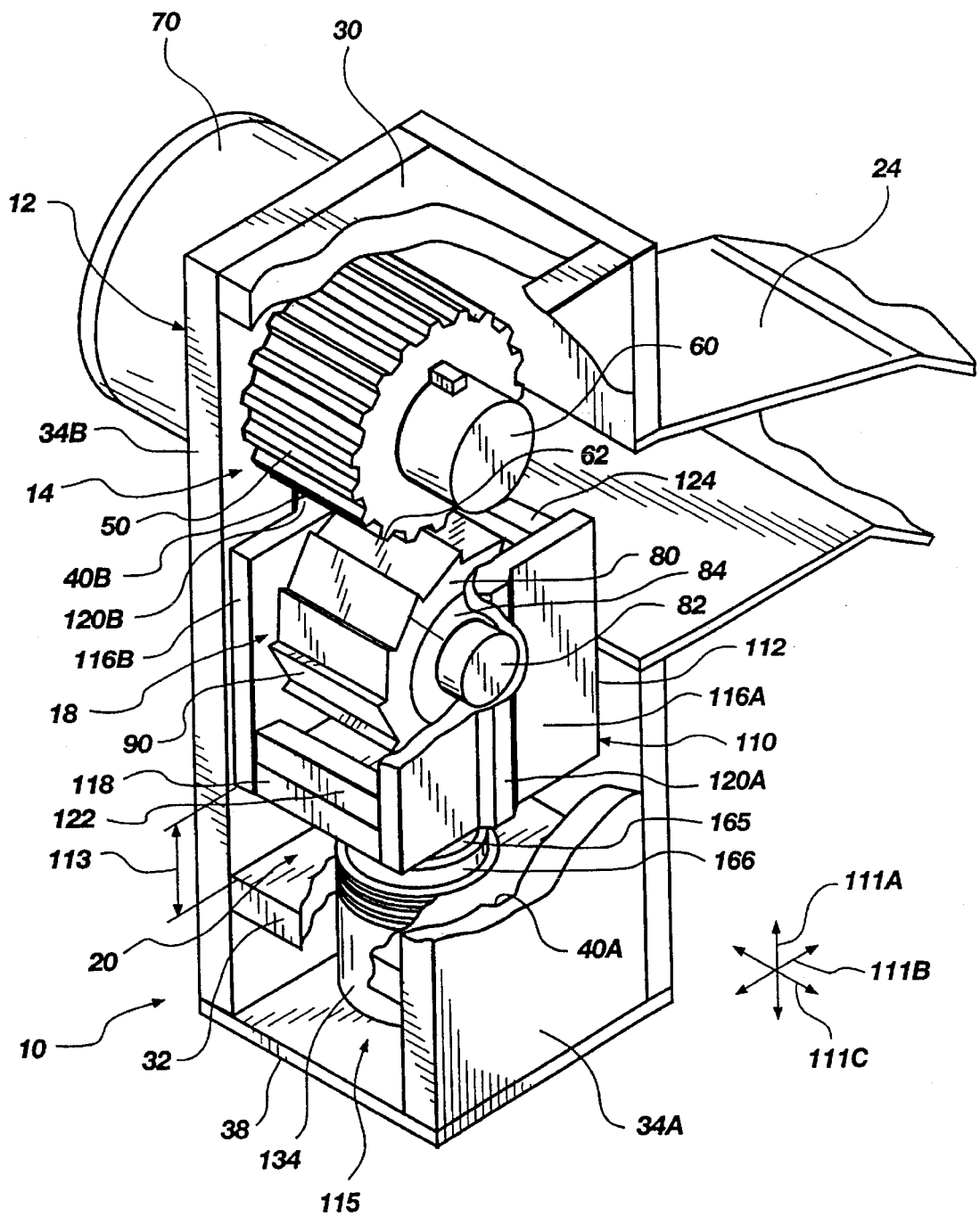
FIG. 1 is a partially cutaway isometric view of one embodiment of an apparatus in accordance with the invention.
Figure 2:
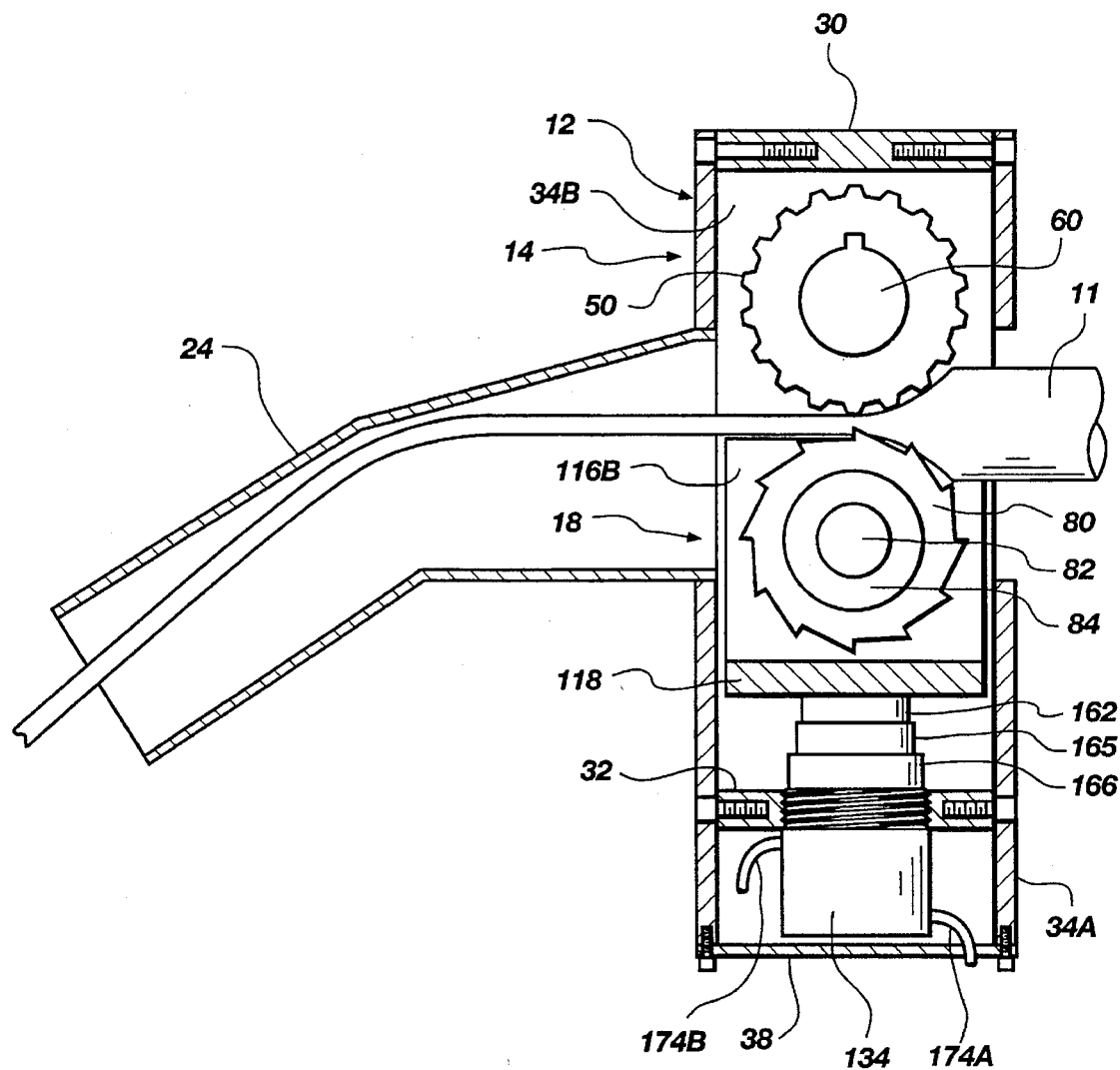
FIG. 2 is a side elevation view of the apparatus of FIG. 1.
Figure 3:
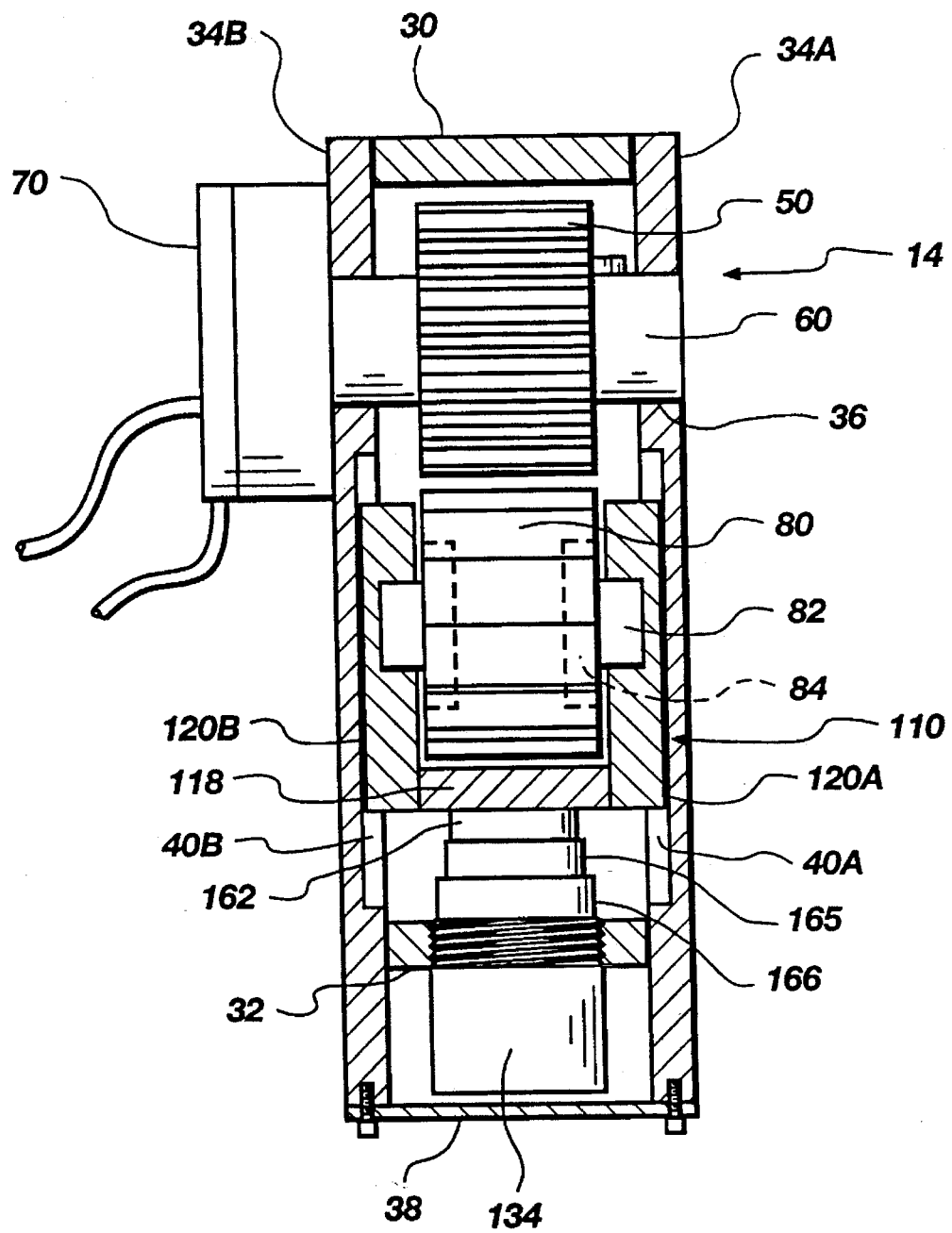
FIG. 3 is a front elevation view of the apparatus of FIG. 1.
Figure 4:
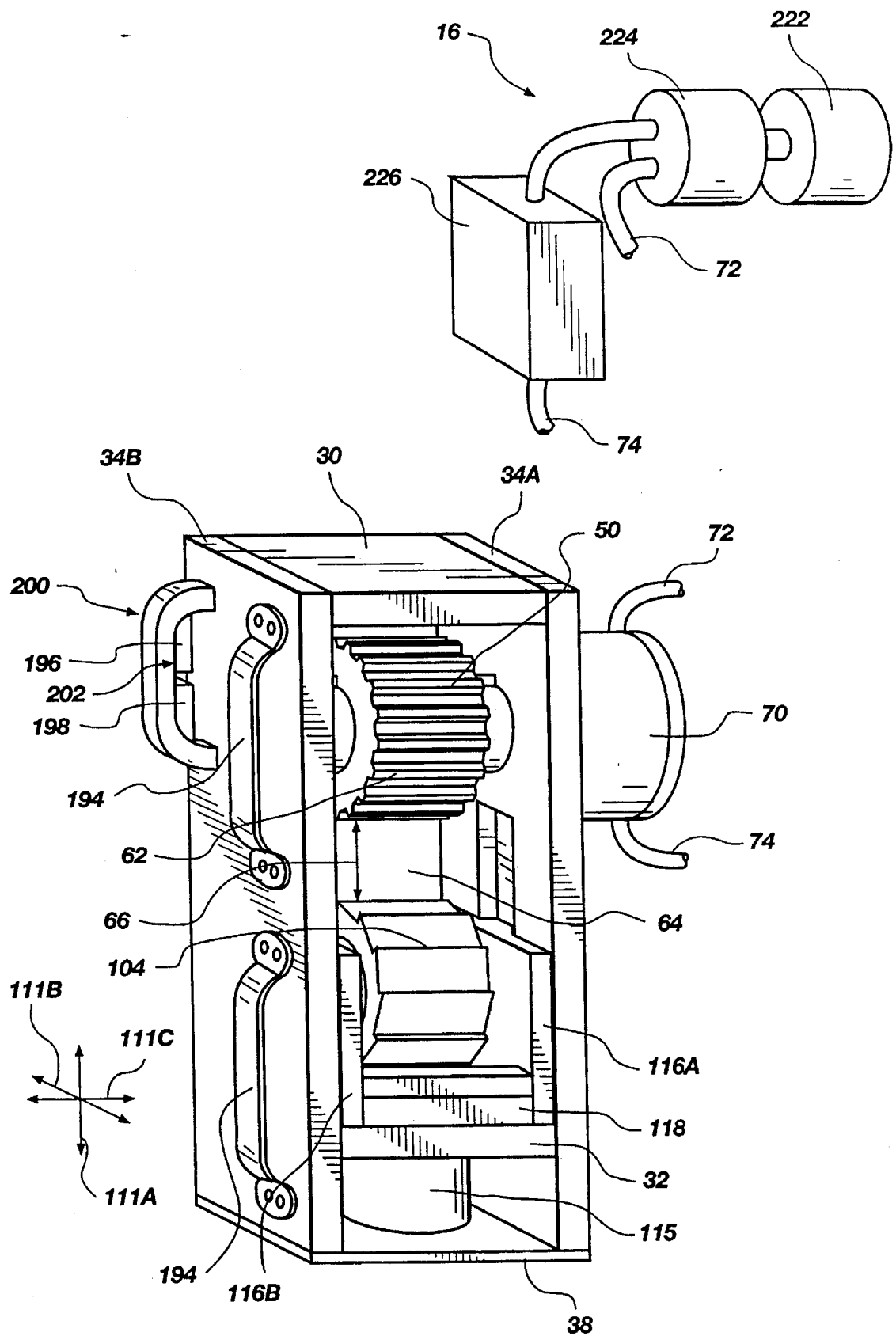
FIG. 4 is a front quarter isometric view of the apparatus of FIG. 1.
Figure 5:
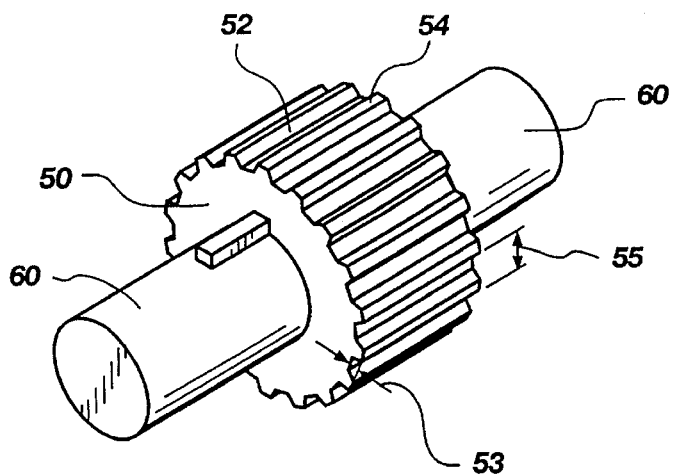
FIG. 5 is an isometric view of one embodiment of a driver of the apparatus of FIG. 1.
Figure 6:
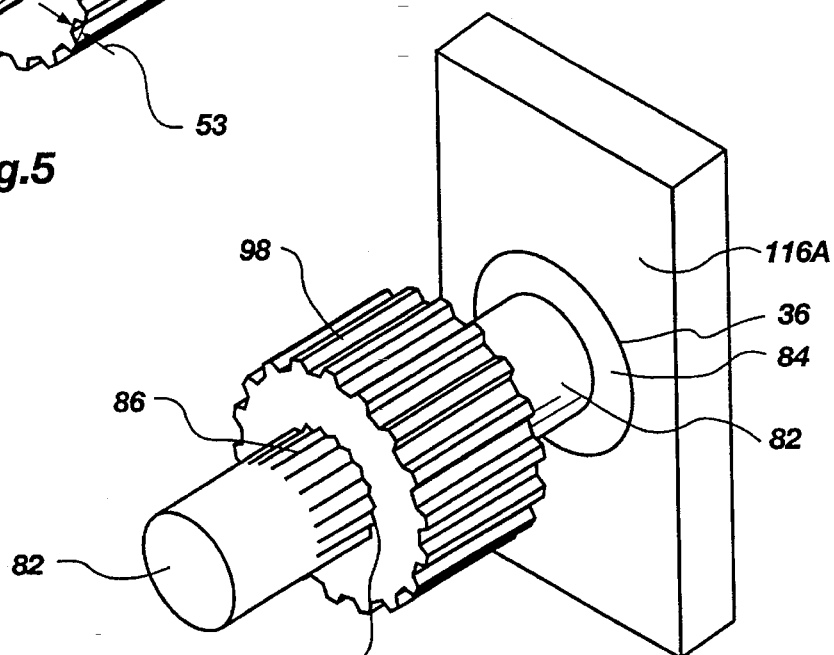
FIG. 6 is an isometric view of an alternate embodiment of an idler of the apparatus of FIG. 1.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 18, is not intended to limit the scope of the invention, as claimed, but it is merely representative of the presently preferred embodiments of the invention.

The presently preferred embodiments of the invention will be best understood by reference to the drawings.

Structure of the Apparatus

The apparatus is best understood by reference to FIGS. 1–18 wherein like parts are designated by like numerals throughout. Referring particularly to FIGS. 1–4, an apparatus 10, for traveling tubes 11 that have been broken free from a tube sheet includes a frame 12. The frame carries a driver 14 rotating under the power of a power supply 16. An idler assembly 18 provides an opposing, rotatable member opposite the driver 14. The idler assembly 18 is carried by a clamping assembly 20 for selectively moving the idler assembly 18 toward and away from the driver 14. The clamping assembly 20 is movably captured within the frame 12. The clamping assembly 20 may translate or pivot with respect to the frame 12. A control system 22 (see FIGS. 16–18) controls the operation of the clamping assembly 20 and the driver 14. A guard 24 may guide a crushed tube 11 away from the frame 12.

A driver 14, in general, may include a wheel or its equivalent for urging a tube 11 out of a position (e.g., in a bulkhead or tube sheet). The wheel may be toothed, knurled, tired, or otherwise treated to grasp a tube 11 and crush it. A driver 14 may include for example a wheel, sprocket, gear, chain, belt, or track. A driver 14 advances the crushed tube 11 even while crushing it. A driver 14 is used to engage a tube 11 and move it in a longitudinal direction. A driver 14 includes the associated axles and bearings, and supports to operate within a frame 12.

The frame 12 is understood by reference to FIGS. 1–4 in which a head block 30 and a foot block 32 are attached together by a left side block 34A and right side block 34B. A bearing aperture 36 may, for example, be formed within each of the side blocks 34A, 34B. A cover plate 38 may be provided and may be positioned and sized to provide protection within the frame 12. The cover plate 38 may be a structural, load-bearing member, depending on the sizing of the head block 30 and foot block 32. Ways 40A, 40B may be provided in the frame 12 to restrain the clamping assembly 20 to movement along a single linear direction. Brace blocks 42 may be connected at selected locations between the side blocks 34A, 34B to improve structural integrity or to serve as guides or guards. (See FIGS. 12–13.)

The driver 14 is best understood by reference to FIGS. 1–5. The driver 14 includes a wheel 50, that may be constructed to have teeth 52. The teeth 52 have a depth 53 permitting the edge 54 of the teeth 52 to apply sufficient force and stress against the side of a tube 11 to be pulled. A buttress 56 of each tooth 52 supports the edge 54 of the tooth 52. Since stress is force per unit area, a narrow edge 54 increases the gripping ability of the wheel 50. That is, the larger the buttress 56 portion of the tooth 52, the less the portion of the tooth 52 near the edge 54 applying force to grip a tube 11.

The driver 14 also may include bearings 84 (see FIG. 6) retained in the bearing apertures 36 for carrying an axle 60 (see FIGS. 1–5). The axle 60 supports and rotates the wheel 50. The wheel 50 is sized to provide a nip point 62. The nip point 62 is related to the nip 64, defined by the gap or clearance 66 between the driver 14, and the idler assembly 18. The nip point 62 is a position at which a tube 11 is engaged by the wheel 50 and drawn into the nip 64. Outside the nip point 62, (further away from a plane defined by the axles 60, 82) a tube 11 may simply be kicked away from the wheel 50 by the striking of the teeth 52. Inside the nip point 62, a tube 11 is captured by the teeth 52 of the wheel 50 and pulled on into the nip 64.

The power supply 16 may include a motor 70. The motor 70 may be electric, pneumatic or hydraulic. The supporting members of the power supply may include those means known in the art for driving, regulating, switching and otherwise supporting the motor 70. For example, a pneumatic or hydraulic type of system may rely on a pump driven by a motor for generating a supply of fluid under pressure. A power supply may include regulators, buffers, sumps, vents, pressure relief valves and lines (conduits) for transferring the working fluid between such components.

A motor 70 in one presently preferred embodiment of the apparatus is hydraulic. Relatively incompressible working fluids (hydraulic oil, for example) provide ready speed control in a positive displacement motor. Hydraulic motors also provide maximum torque density at the motor 70. That is, the most torque in the smallest motor 70 is typically available in hydraulic systems. However, the inlet line 72 and outlet line 74 may extend to a large pump 224 and reservoir 226 or sump 226 located remotely from the motor 70.

Thus, the torque per unit of volume provided through the shaft 60 by the motor 70 is larger than that for an electric motor 70. However, an electric motor 70 has the advantage that it does not require such a large supporting physical plant as the pump 224 and reservoir 226 or sump 226 of a hydraulic system.

Likewise, pneumatic motors 70 may serve well. Pneumatic motors operate on different principles, however, and must be treated somewhat differently. Pneumatic motors 70 can accumulate pressurized working fluid (air) when stalled. The motor may stall when a plug (large, fouling deposit) is encountered in a tube 11. The high pressure may lead to a burst of speed once the load resisting the motor 70 is overcome by the motor 70. If pressure is regulated to prevent excess pressure, torque is limited and the motor may stall until relieved. Electric motors 70 may fail if stalled. Electric motors 70 also have less torque than a similarly rated hydraulic motor 70. Therefore, these differences may affect the choice and use of electric motors 70, pneumatic motors 70, and hydraulic motors 70.

The shaft of the motor 70 may double as the axle 60. With suitable methods for mounting the bearings 58 and the motor 70, the wheel 50 may be keyed or splined to the shaft 60 directly. This arrangement may risk the shaft 60 bending under excessive loads, but results in fewer components moving with respect to one another.

The idler assembly 18 is best understood by reference to FIGS. 4–10. The idler assembly 18 includes an idler 80 supported by an axle 82. The bearing 84 may be secured inside the idler 80 to permit the axle 82 to be non-rotatably mounted. The idler 80 is free to rotate in this embodiment.

An idler assembly 18, in general, may include any wheel (idler 80) or its equivalent, having no source of power directly connected to urge rotation. Rather the idler 80 simply rotates with anything that contacts it, such as a tube 11 being moved by a driver 14.

Alternatively, the axle 82 may be fixedly mounted to the idler 80 to rotate with the idler 80. In this embodiment, the bearing 84 may be mounted in the frame 12 to support the axle 82 rotating within the bearing 84 as in FIG. 6. The idler 80 may be secured to the axle 82 by splines 86 on the axle 82 fitted to matching splines 88 in the idler 80. Alternatively, the idler 80 may be keyed like the wheel 50 of FIG. 5. The idler may be completely free to rotate, or free to rotate in only one direction.

Figure 7:
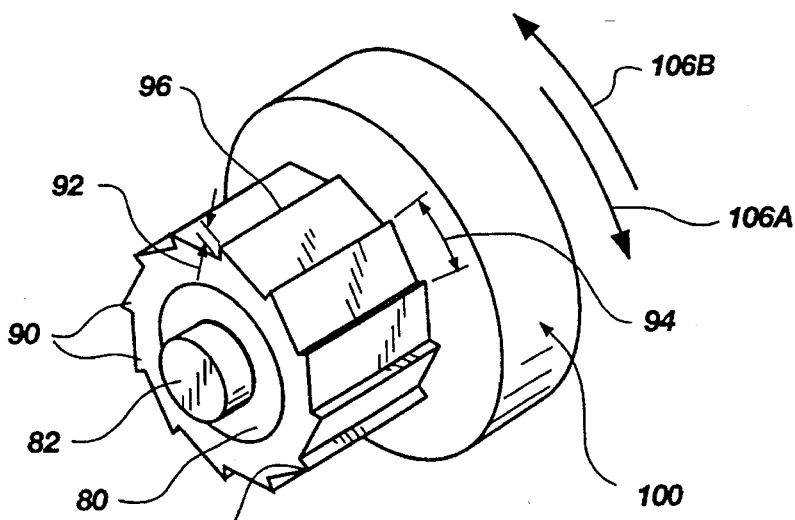
FIG. 7 is an isometric view of an alternate embodiment of an idler of the apparatus of FIG. 1 connected to a unidirectional clutch.
Figure 8:
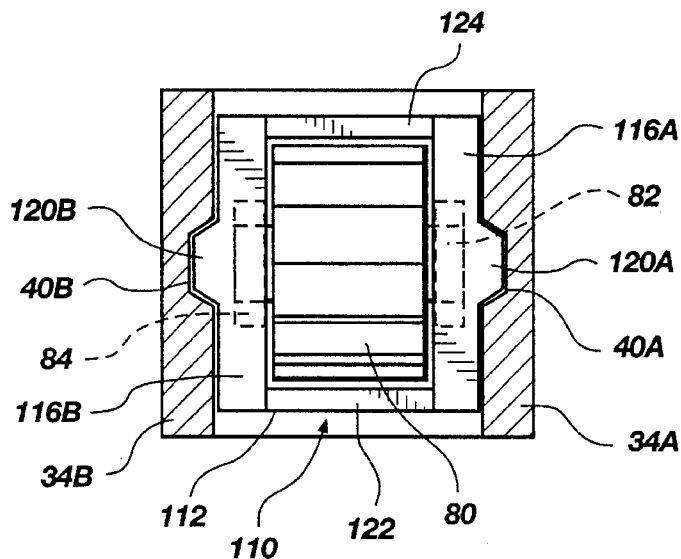
FIGS. 8–10 are top plan views of alternate embodiments of the carriage and idler of the apparatus of FIG. 1.
Figure 9:
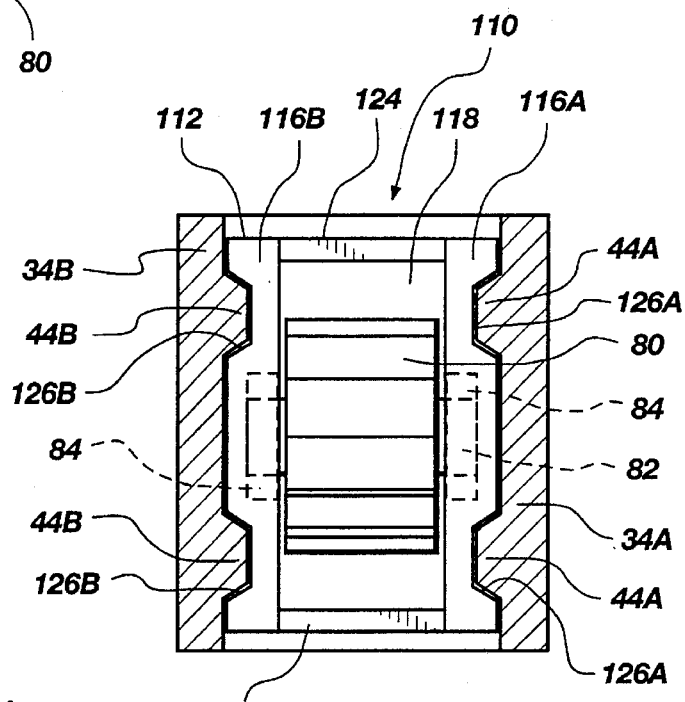
Figure 10:
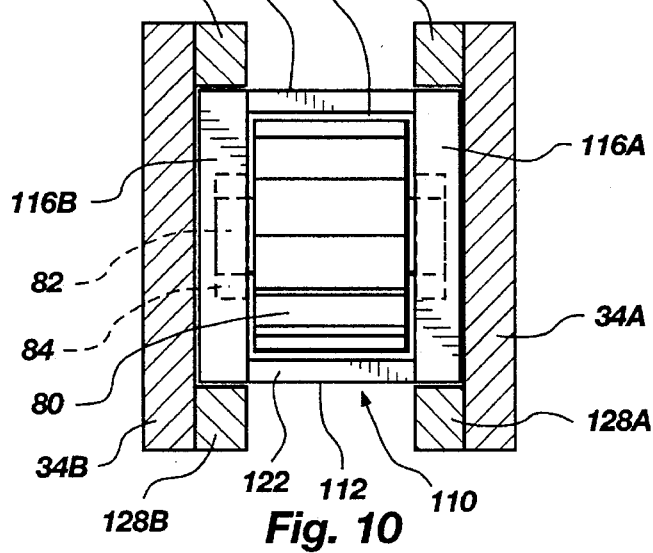

In FIG. 7, the idler 80 may have teeth 90 having a height 92 and pitch 94 selected to engage the tube 11 being pulled (traveled). The wheel 50 of the driver 14 may be similarly constructed. However, the idler 80 and wheel 50 operate somewhat differently. The surface 98 of the idler 80 serves to crush the tube 11, although the edge 96 actually provides the principal means for engaging the tube 11, and for crushing. That is, the edge 96 tends to actually dig into a tube 11 while applying a crushing force.

The unidirectional clutch 100 (sometimes called a "no-back clutch") may be connected between the frame 12 and the idler 80. The unidirectional clutch 100 permits the idler 80 to rotate in the forward direction 106A. The idler 80 is restrained by the clutch 100 from moving in the backward direction 106B. Thus, the idler 80 does not provide power to advance the tube 11. That power is provided by the driver 14 through the wheel 50 to the tube 11 being traveled. The tube 11 actually rotates the idler 80. However, once rotated in the forward direction 106A, the idler 80 is not free in this embodiment to retreat in a backward direction 106B.

A no-back clutch 100, in general, may be any unidirectional clutch. The clutch 100 may include a mechanism that attaches to a rotating first member and a second member. The first member is free to rotate in a first direction with respect to the second member. However, the first member is restricted from rotating in a second direction opposite the first direction.

Nip points 62, 104 exist for the wheel 50 and idler 80, respectively. The nip point 104 for the unpowered idler 80 may be located more remotely from the nip 64, because the idler 80 is not powered. In one embodiment, the idler 80 can be larger than the wheel 50 to promote engagement of the tube 11 by the nip 64. In another embodiment, a series of rollers (not shown) may be located ahead of the idler 80 to promote feeding the tube 11 into the nip 64. In a less preferred embodiment, the idler 80 may be replaced by another wheel 50 and associated driver 14. However, the motion of the carriage 110, among other features, can eliminate the need to deliver power to the idler 80.

In one alternative embodiment, no unidirectional clutch 100 is used, and the teeth 90 are oriented in an opposite direction from that of FIG. 7. Thus, the tube 11 more easily engages the idler 80 to rotate the idler 80.

The carriage 110 may be embodied in a slide 112 as illustrated in FIGS. 1–4 and 8–10. The slide is free to move in the clamping direction 111A, but is restrained in the fore and aft direction 111B and lateral direction 111C. The slide 112 carrying the idler 80 operates with a stroke 113 to change the clearance 66 between the idler 80 and the wheel 50.

Alternatively, the carriage 110 may be embodied as a jaw 114 pivotably attached to the frame 12 as illustrated in FIGS. 11–13. The carriage 110 may be moved by an actuator 115, regardless of the embodiment chosen for the carriage 110.

The slide 112 may include side panels 116A, 116B fixed to a base block 118. The side panels 116A, 116B may be provided with lands 120A, 120B, respectively fitted to slide within the ways 40A, 40B, respectively, of the frame 12. (See FIGS. 1–4 and 8.) In one embodiment a front block 122 and back block 124 may be secured between the side panels 116A, 116B to add structural strength, rigidity, or both. The front and back blocks 122, 124 also serve to enclose the idler 80 for cleanliness and protection.

Alternatively, the ways 126A, 126B may be formed in the side panels 116A, 116B, respectively, for capturing therein the lands 44A, 44B. (See FIG. 9.) The lands 44A, 44B may be formed on or attached to the side blocks 34A, 34B, respectively. With proper lubrication, the trapezoidal ways 40A, 40B, 126A, 126B and their respective lands 44A, 44B, 120A, 120B may provide both retention and bearing for the slide 112 type of carriage 110.

In another embodiment, the rails 128A, 128B may be mounted to the side blocks 34A, 34B respectively. The side blocks 34A, 34B restrain and bear the slide 112 in the lateral direction 111C. The rails 128A, 128B restrain and bear the slide 112 in the fore and aft direction 111B.

The carriage 110 embodied in a jaw 114 is illustrated in FIGS. 11–13. The jaw 114 of FIG. 11 includes a mandible 130, and may have a ramus portion 131. The jaw 114 is pivotably connected to the frame 12 by the pivot shaft 132 extending between the left and right side blocks 34A, 34B.

Actuation of the slide 112 may be hydraulic, pneumatic, electric, or manual. However, the jaw 114 and the slide 112 can be actuated by analogous means. The actuation of the jaw 114, however, presents several alternatives affecting the embodiment of the jaw 114.

An actuator 115 may be a hydraulic or pneumatic cylinder 134 or equivalent apparatus for linear actuation. The cylinder 134 in the illustrated embodiment includes a base 136 having an eye 137 provided with an aperture 138 for receiving an anchor shaft 140. The anchor shaft 140 and pivot shaft 132 may be similarly attached to the frame 12.

A ram 142 is extendible from the cylinder 134, and may be selectively extendible. The ram 142 may also be selectively retractable if the cylinder 134 is a double acting cylinder. A head 144 is connected to the ram 142. The head has an eye 145 provided with an aperture 146 therein for receiving a swing shaft 148.

The mandible may be constructed as the slide 112 to have side panels 116A, 116B, base block 118, and front and back blocks 122, 124. Construction would preferably be modified to optimize the permitted physical motion of the jaw 114 in carrying the idler 80 toward and away from the wheel 50. Optional brace blocks 150 may be mounted to extend between the side panels 116A, 116B of the mandible 130 as needed for structural strength and stability.

Suitable bearings, journals, bushings or other means for friction reduction (not shown) are preferably interposed between the frame 12 and the jaw 114. Such means may be attached in an embodiment to support each shaft 132, 140, 148. Alternatively, a friction-reducing structure could be connected to support the jaw 114 on the shafts 132, 140, 148. The various combinations of these alternatives are also contemplated.

An actuator 115 may be a hydraulic cylinder, pneumatic cylinder, four-bar linkage (not shown), or equivalents, each with a somewhat different result. The actuator 115 may be capable of selective actuation.

Figure 15:
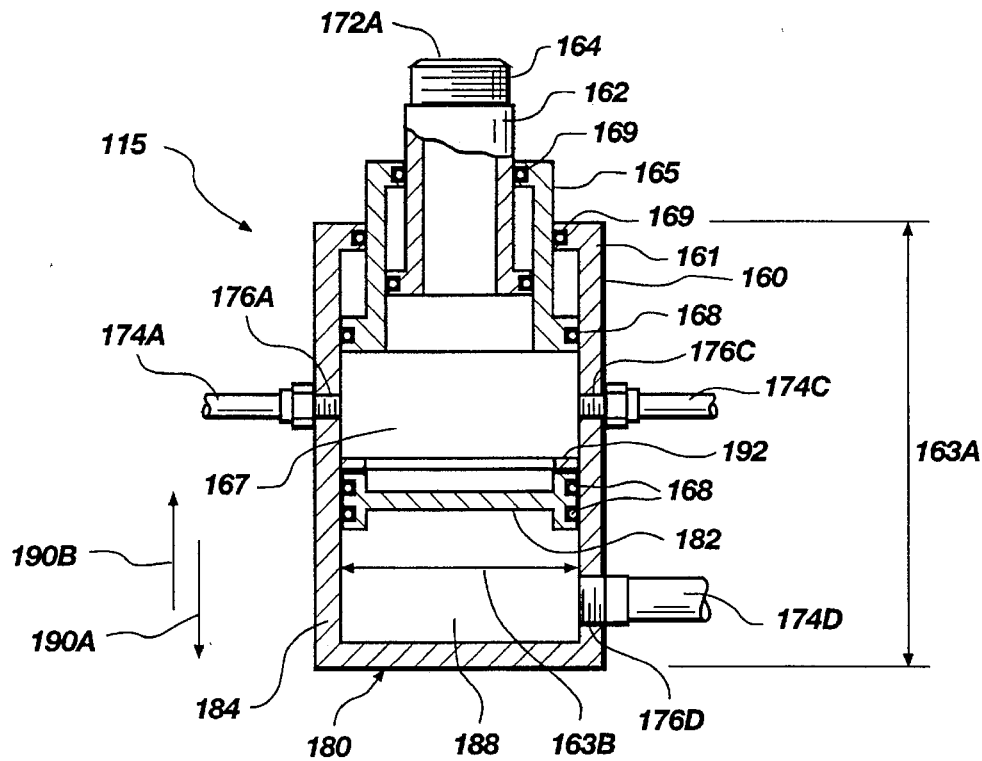
FIGS. 14–15 are side elevation views of alternative embodiments of actuators for the apparatus of FIG. 1.
Figure 14:
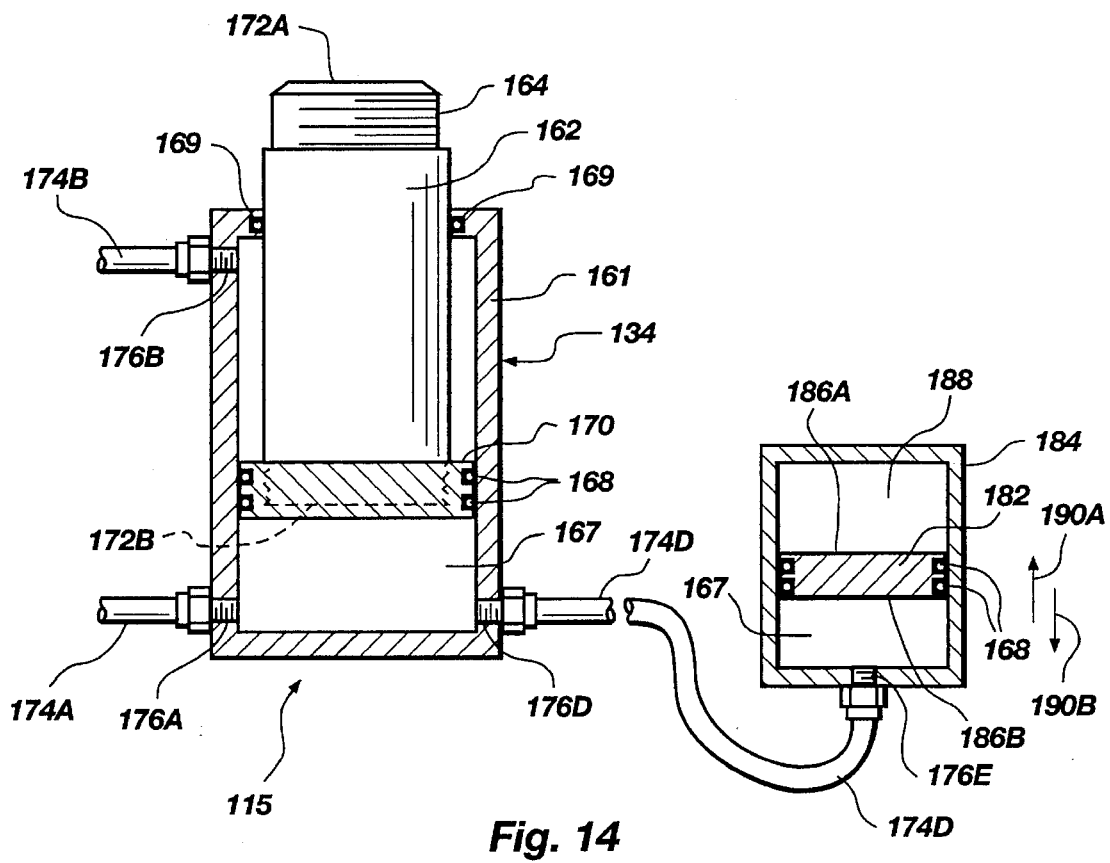

The embodiments of FIGS. 14–15 illustrate a housing 160 having a wall 161. A ram 162 is extendible from the housing 160, and may terminate in threads 164 or other suitable means for attachment. To form a more compact frame 12, a length 163A of the housing 160 may be minimized by adding a secondary ram 165 and tertiary ram 166 located concentrically with the ram 162, as illustrated in FIGS. 1 and 15. The diameter 163B inside the housing 160 may be selected to optimize the force applied by the ram 162 for the range of pressures expected from the power supply 16.

Oil 167 may be used, (or air in pneumatic systems) as a working fluid provided by the power supply 16. Seals 168, 169 may be 'O' rings 168, 169 for sealing the rams 162, 165, 166 against leakage of the working fluid. Oil 167 is substantially incompressible. That is, it will not change volume more than a few percent under contemplated operating conditions. Air by contrast is compressible, changing volume by approximately 100 percent with an approximately 50 percent decrease in absolute pressure.

A piston 170 may be secured to a ram 162 as in FIG. 14, or the ram 162 may serve the piston function as in FIG. 15. In either embodiment and their variations, an actuator 115 may be double acting. An extension line 174A may provide oil 167 under pressure from the power supply 16. The actuator 115 may receive a working fluid such as oil 167 from a power supply 16 through a retraction line 174B to retract the ram 162 into the housing 160 in a double-acting embodiment.

More than one power supply 16 may be used. For example, the actuator 115 and the motor 70 could be powered pneumatically and hydraulically, respectively. Alternatively, a single power supply 16 may be configured to provide oil 167 to the motor 70 and the actuator 115.

Other lines 174C may be added to a single-acting embodiment to conduct exiting oil 167 away. Alternatively, an actuator 115 may be single-acting and rely on a single line 174A both for introducing oil 167 for extension and for conducting away exiting oil 167 for retraction. In a single-acting embodiment, the idler 80 on the carriage 110 connected to the end 172A of the ram 162 would not be retractable under power. Instead, a means for biasing the ram 162 toward a retracted position would preferably be used. Retraction is not required, although preferred.

The buffer 180 may be separated (FIG. 14) or integrated (FIG. 15) with the actuator 115. The buffer may include a piston 182, diaphragm (not shown), or equivalent movable member having two sides 186A, 186B to separate the working fluid (oil 167 in the illustrated example) from a gas 188.

The piston preferably moves in a direction 190A in response to an impact on the idler 80. For example, when the idler 80 encounters a plug in a tube 11, the idler 80 moves away from the driver 14 and the associated wheel 50. Moving with the idler 80, the carriage 110 pushes the ram 162 into a retracted position. The oil 167, being incompressible cannot reduce appreciably in volume, but pushes against the piston 182 instead. The oil 167 may reach the piston 182 indirectly after passing through a line 174D to the buffer 180 separated from the actuator. (See FIG. 14.) Alternatively, the oil 167 may reach the piston 182 directly in an integrated buffer 180 (See FIG. 15.)

When the plug has passed by the idler, the buffer 180 returns in the direction 190B, forcing oil 167 back into the actuator 115. A stop 192 may be provided to restrict the return motion of the piston 182 or to pre-pressurize the buffer 180 at a fixed volume. The pressure of oil 167 may automatically adjust the pressure of the gas 188 in the buffer 180, particularly if the piston 182 is not arrested by the stop 192.

Control of the traveler 10 is best understood by reference to FIGS. 4 and 16–18. The frame 12 may be mounted by a suitable support (not shown) to be movable by an operator. The frame 12 may be moved directly by an operator to a tube 11 to be pulled using handles 194. Near the handles 194, an operator may control the supply of oil 167 (or other working fluid) to the motor 70 and the actuator 115. For example, the operator may activate a trigger 196 and its restrictive interlock 198 combined for safety as the switch 202 of a controller 200. Also, the trigger 196, the interlock 198, or both, may be foot-operated, hand-operated, finger-operated, thumb-operated or the like in order to insure strictly safe activation of the driver 14.

Figure 16:
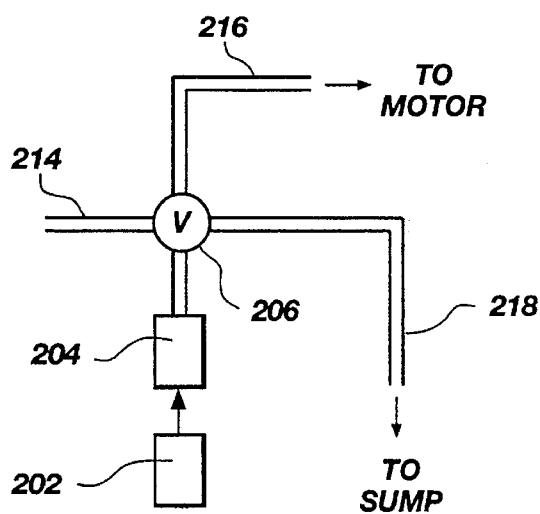
FIGS. 16–18 are schematics of alternative embodiments of controls for controlling the apparatus of FIG. 1.
Figure 17:
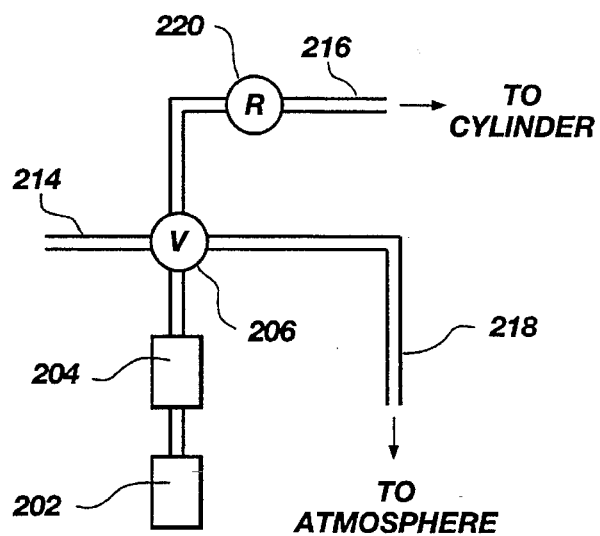
Figure 18:
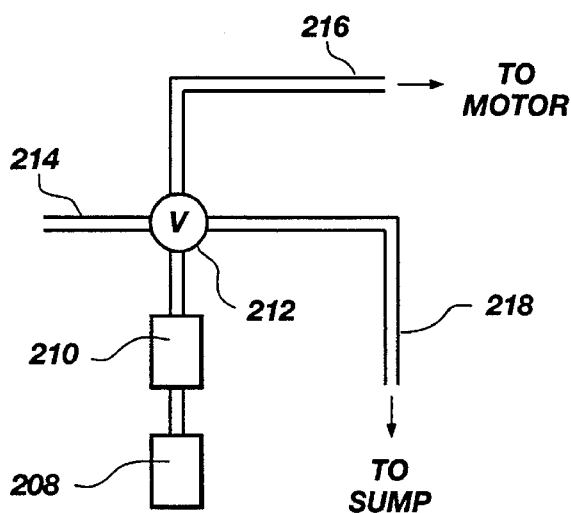

The switch 202 may operate a solenoid 204 to open and close a valve 206 as illustrated in FIG. 16. This embodiment can be used with most working fluids. However a power supply 16 providing a gas as a working fluid may preferably be regulated at one or more locations.

Alternatively, a proportional controller 208 may be provided to limit the working fluid (such as oil 167) passing from the power supply 16 to the motor 70. The proportional controller 208 may be manual, electrical, electronic, or microprocessor based. The proportional controller 208 sends a signal to an actuator 210. The actuator 210, in turn, powers movement of a proportional valve 212. The proportional valve 212, alone or in duplicate, provides a supply of oil 167 to the motor 70, the actuator 115, or both. The proportional valve 212 receives oil 167 from an inlet line 214 at high pressure. The amount of oil 167 passed by the proportional valve 212 to the motor 70 and actuator 115 is conducted out the outlet line 216. Any oil 167 bypassed by the proportional valve 212 goes to a dump line 218.

In general, a controller 200 may include a switch, valve, lever, solenoid, other device, or combination for activating a movable member of the apparatus 10. A controller 200 may be manual or automatic, and may operate on a fixed routine or may include a programmably controlled microprocessor or other electronic control.

In general, an actuator (such as actuator 210) is contemplated to be an apparatus that moves an object in a direction by applying force in that direction. Hydraulic cylinders, linear motors, ball screws, and other devices that can be attached to a source of power to translate an object under load are suitable actuators. Actuators may be provided with a control suitable for activating an actuator.

A regulator 220 may be provided to limit pressure to the motor 70 or actuator 115 in a pneumatic system. Also, the dump line 218 may simply pass air to the atmosphere.

For a hydraulic type of power supply 16, a drive motor 22 may drive a pump 224 that both receives from and discharges to a sump 226. The dump line 218 in such an embodiment, may dump oil to the sump 226. A power supply 16 and controller 200 may also be configured to provide a regulated, pressurized supply of oil 167 directly to the proportional valve 212. In such an embodiment, the dump line may not be necessary. In a single-acting hydraulic actuator 115, the valve 206 or valve 208 may be configured to receive back oil 167 from the actuator 115, passing the oil 167 on to the dump line 218 and the sump 226.

Operation

In operation, the traveler 10 is moved toward an end of a tube 11 to be pulled. The clearance 66 may be set, upon completion of the previous, complete cycle. The clearance may be set to form a nip 64 that can receive the tube 11 without interference. The operator grasps one or more of the handles 194 and moves the frame 12 toward the end of the tube 11 until the tube 11 is positioned between the idler 80 and the wheel 50 of the driver 14. The operator activates the switch 202 by holding the interlock 198 and pulling the trigger 196. The switch 202 preferably signals proportionately to its movement as a part of the proportional controller 208.

The proportional controller commands the actuator 210 which moves the proportional valve 212 open in response. Oil 167 is passed at a controlled flow rate to the outlet line 216. The outlet line 216 feeds the oil 167 to the extension line 174A on the actuator 115 and the inlet line 72 on the motor 70.

The ram 162 extends, forcing the idler 80 on the carriage 110 against the side of the tube 11. The shaft 60 connected to the motor 70 begins rotating the wheel 50. The tube 11 is clamped between the wheel 50 and the idler 80. The tube 11 collapses laterally under the force of the actuator 115, and moves longitudinally through the frame 12 between the wheel 50 and the idler 80. The guard 24 deflects the crushed, exiting tube 11 away from operators and equipment.

The operator may adjust the position of the trigger 196 to change the speed of the motor 70. The actuator 115 may be exposed to substantially the same pressure as the motor 70, and may increase the gripping force of the idler 80 if pressure rises in the oil 167.

Upon release of the trigger 196, the same trigger 196 or another may activate the proportional valve 212 to retract the ram 162, moving the idler 80 to an open position away from the wheel 50 of the driver 14. The nip 64 is ready to receive another tube 11.

The wheel 50 may operate to draw a tube 11 into the nip 64, even when the idler 80 is in a "closed" position close to the wheel 50. This is not a preferred embodiment unless the tube 11 are not to be completely crushed, or the optional unidirectional clutch 100 is connected to a toothed idler 80.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for pulling a tube, the tube having a wall traversed by an outer diameter and circumscribed by an outer circumference, and a length extending between a first end and a second end, the apparatus comprising:

a frame having a rigid member;

a motor having a housing secured to the rigid member of the frame and having a shaft extending away from the housing and terminating in an end, the shaft being rotatable with respect to the frame;

a driver connected to rotate with the shaft for contacting the tube at a location proximate the outer diameter of the tube and for translating the tube in a longitudinal direction from the first end to the second end; and an idler rotatably connected to the frame to rotate freely in at least one direction and to selectively urge the tube in a lateral direction against the driver for collapsing one portion of the wall toward another portion of the wall.

2. The apparatus of claim 1 wherein the frame comprises:

a head block;

a foot block spaced apart from the head block;

a first plate attached to extend between the head block and the foot block;

a second plate spaced apart from the first plate and positioned to extend substantially parallel thereto to extend between the head block and the foot block.

3. The apparatus of claim 1 wherein the driver is a wheel provided with teeth extending radially away from a center.

4. The apparatus of claim 1 further comprising a carriage connected to rotatably carry the idler, the carriage being movably connected to the frame to selectively position the idler with respect to the driver.

5. The apparatus of claim 1 further comprising a jaw pivotably connected at one end to the frame, the idler being rotatably mounted to another end of the jaw, the jaw being selectively positionable between a first position wherein the idler is positioned away from the driver and a second position wherein the idler is positioned proximate the driver.

6. The apparatus of claim 1 further comprising an actuator connected between the frame and the idler for selectively moving the idler between a first position away from the driver and a second position proximate the driver.

7. The apparatus of claim 1 wherein the idler further comprises teeth for engaging the tube.

8. The apparatus of claim 1 further comprising a unidirectional clutch connected between the frame and the idler for limiting rotation of the idler to movement in a single direction.

9. The apparatus of claim 1 further comprising a controller connected to the motor for controlling a speed of rotation of the driver.

10. The apparatus of claim 1 wherein the motor is a hydraulic motor and further comprising:

a hydraulic actuator for moving the idler between a first position away from the driver and a second position proximate the driver;

a controller connected to operate a hydraulic line for selectively providing a flow of hydraulic fluid to the hydraulic line under pressure, the hydraulic motor and the hydraulic actuator being connected in parallel arrangement to the hydraulic line for receiving the flow of hydraulic fluid under pressure.

11. The apparatus of claim 1 further comprising:

a hydraulic actuator for moving the idler between a first position away from the driver and a second position proximate the driver;

a hydraulic fluid selectively moveable into and out of the hydraulic actuator for urging the actuator between the first position and the second position, the hydraulic fluid being selected to be substantially incompressible;

a buffer in fluid communication with the hydraulic actuator for absorbing impacts received by the hydraulic actuator, the buffer comprising:

a first vessel having a chamber filled with a pressurized gas;

a second vessel having a chamber separated from the first chamber by a movable piston, the second vessel being selectively fillable with the hydraulic fluid; and a movable member connected between the first chamber and the second chamber to adjust a volume of the first chamber.

12. An apparatus for pulling a tube, the apparatus comprising:

a frame;

a motor having a housing fixedly secured to the frame and having a shaft extending away from the housing, the shaft being rotatable with respect to the frame;

a driver connected to rotate with the shaft for contacting the tube and for translating the tube in a longitudinal direction;

an idler rotatably connected to the frame to rotate freely in at least one direction and to selectively urge the tube in a lateral direction against the driver.

13. The apparatus of claim 12 further comprising a carriage connected to rotatably carry the idler, the carriage being movably connected to the frame to selectively position the idler with respect to the driver.

14. The apparatus of claim 13 further comprising an actuator connected between the frame and the carriage for selectively moving the idler between a first position away from the driver and a second position proximate the driver.

15. The apparatus of claim 14 wherein the idler further comprises teeth for engaging the tube.

16. The apparatus of claim 15 further comprising a unidirectional clutch connected between the frame and the idler for limiting rotation of the idler to movement in a single direction.

17. The apparatus of claim 16 wherein the actuator is a hydraulic actuator, the apparatus further comprising:

a buffer in fluid communication with the hydraulic actuator for absorbing impacts received by the hydraulic actuator, the buffer comprising:

a first vessel having a chamber filled with a pressurized gas, a second vessel having a chamber separated from the first chamber by a movable piston, the second vessel being selectively fillable with the hydraulic fluid, and a movable member connected between the first chamber and the second chamber to adjust a volume of the first chamber.

18. The apparatus of claim 16 wherein the motor is a hydraulic motor and the actuator is a hydraulic actuator, the apparatus further comprising a controller connected to operate a hydraulic line for selectively providing a flow of hydraulic fluid to the hydraulic line under pressure, the hydraulic motor and the hydraulic actuator being connected in parallel arrangement to the hydraulic line for receiving the flow of hydraulic fluid under pressure.

19. An apparatus for removing tubes from a tube sheet, the apparatus comprising:

a frame;

a motor having a housing fixedly secured to the frame and a having a shaft extending away from the housing and terminating in an end, the shaft being rotatable with respect to the frame;

a driver connected to rotate with the shaft for contacting the tube at a location proximate the outer diameter of the tube and for translating the tube in a longitudinal direction from the first end to the second end;

a controller connected to the motor for controlling a rotational speed of the driver;

an idler rotatably connected to the frame to rotate freely in at least one direction and to selectively urge the tube in a lateral direction against the driver for collapsing one portion of the wall toward another portion of the wall;

a carriage connected to rotatably carry the idler, the carriage being movably connected to the frame to selectively position the idler with respect to the driver;

an actuator connected between the frame and the idler for selectively moving the idler between a first position away from the driver and a second position proximate the driver;

a fluid selectively moveable into and out of the actuator for urging the actuator between the first position and the second position; and a buffer in fluid communication with the actuator for absorbing impacts received by the actuator.

* * * * *